United States Patent [19]

Shima et al.

[11] 4,272,992

[45] Jun. 16, 1981

[54] TORSIONAL VIBRATION MONITORING METHOD FOR ROTATING SHAFT SYSTEM

[76] Inventors: Ichiji Shima; Tatsuo Yamamoto; Shigeru Yoshibayashi; Hiroshi Teshima, all c/o The Kansai Electric Power Co., Inc., Technical Research Center of 2, Ichinotsubo 1-chome, Wakaoji, Amagasaki City, Osaka; Akio Hizume, 8-11, Naka-machi 1-chome, Setagaya-ku, Tokyo; Tetsuo Iki, 1998-5, Yokoo-machi, Nagasaki City, Nagasaki Pref.; Takashi Yamamoto, 347, Motomurago, Tokitsu-cho, Nishisonogi-gun, Nagasaki Pref.; Kyozo Kanamori, 16-10, Shiraiwa-cho, Isahaya City, Nagasaki Pref.; Kenzo Noguchi, 5-24, Nameshi 6-chome, Nagasaki City, Nagasaki Pref., all of Japan

[21] Appl. No.: 49,983

[22] Filed: Jun. 19, 1979

[30] Foreign Application Priority Data

Jun. 23, 1978 [JP] Japan .................................. 53-76131

[51] Int. Cl.³ ........................................... G01N 29/04
[52] U.S. Cl. ..................................................... 73/650
[58] Field of Search ........................................ 73/650

[56] References Cited

U.S. PATENT DOCUMENTS 4,051,427  9/1977  Kilgore .................................. 73/650

*Primary Examiner*—Anthony V. Ciarlante
*Attorney, Agent, or Firm*—Toren, McGeady and Stanger

[57] ABSTRACT

The disclosed torsional vibration monitoring method measures torsional vibrations produced in a rotating shaft system, for apparatuses such as a turbine generator, at a small number of measurable points on the system and the measured torsional vibrations are linearly separated to estimate torsional vibrations at arbitrary positions of the system are estimated. According to one particularly, to a high precision torsional vibration monitoring method, up to 2n torsional vibrations at the arbitrary positions are obtained from the torsional vibrations detected at n selected positions of the rotating shaft system.

5 Claims, 10 Drawing Figures

FIG. 2
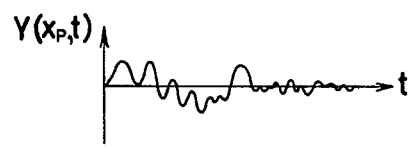
FIG. 2A
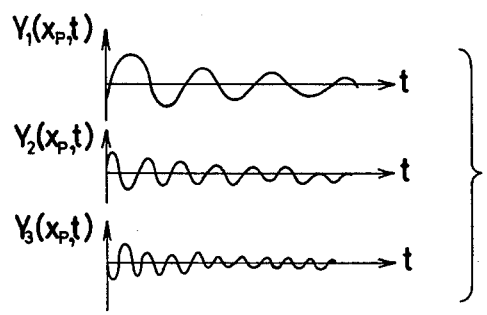
FIG. 2B
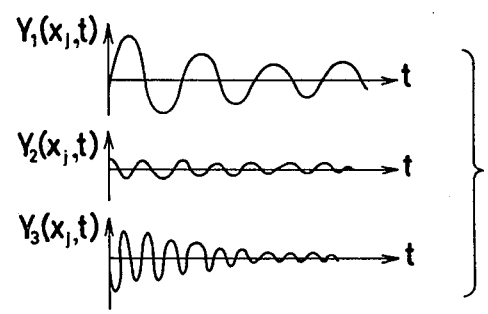
FIG. 2C
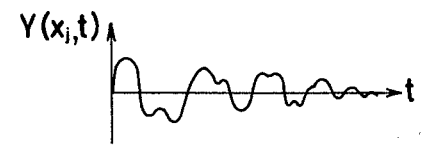
FIG. 2D
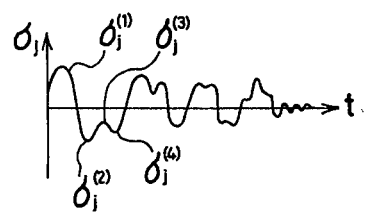
FIG. 2E

TORSIONAL VIBRATION MONITORING METHOD FOR ROTATING SHAFT SYSTEM

BACKGROUND OF THE INVENTION

1. Field of the Invention

The present invention relates to a torsional vibration monitoring method for a rotating shaft system of apparatuses such as a turbine generator, in which torsional vibrations produced in the rotating shaft system are measured at a small number of measurable points on the system and torsional vibrations at arbitrary points on the same are estimated by linearly decomposing the measured vibrations. The invention relates particularly to a torsional vibration monitoring method of the type mentioned, in which up to 2n degrees of the vibrations at the arbitrary points are obtained from the detected torsional vibrations, so as to achieve a high precision torsional vibration monitoring method.

2. Description of the Prior Art

It has been known that it is important for designers to know various disturbances introduced into a rotating shaft system of apparatuses such as a turbine generator, compressor and marine diesel engine and, particularly, that it is important for operators to know the fatigue life of the rotating shaft system.

The rotating shaft system for a turbine generator is, however, very long and may be as long as several tens of meters. Therefore, it generally requires several measuring points to measure the disturbances along the shaft system.

Furthermore, it is important to measure the torsional vibrations produced in the rotating shaft system because they may damage the rotating shaft due to fatigue. However, it is economically disadvatageous to provide a number of torsional vibration measuring devices along the shaft and sometimes it is impossible to do so physically.

According to vibration theory, the torsional vibration $Y(x,t)$ produced in the rotating shaft system is represented by a sum of modal vibrations $Y_i(x,t)$ and each modal vibration is represented by a product of vibration mode type $G_i(x)$ and vibration mode component $H_i(t)$, as follows:

$$Y(x,t) = \Sigma Y_i(x,t) \tag{1}$$

$$\Sigma G_i(x) \cdot H_i(t) \tag{2}$$

The vibration mode type $G_i(x)$ is as shown in FIG. 1 and is previously determined dependent on a specific shaft system, $\|G_i(x)\| \doteq 0$ when $i \to \infty$.

By selecting i as a suitable value n, equation (2) can be rewritten as follow:

$$Y(x,t) = \sum_{i=1}^{n} G_i(x) \cdot H_i(t) \tag{3}$$

Therefore, n sets of torsional vibrations (See FIG. 2A) measured at n positions pk (coordinate being $x_{pk}$, k=1, ..., n) on the rotating shaft system are represented as follow:

$$Y(x_{p1},t) = \overset{n}{\Sigma} G_i(x_{p1}) \cdot H_i(t)$$
$$Y(x_{pn},t) = \overset{n}{\Sigma} G_i(x_{pn}) \cdot H_i(t) \tag{3}'$$

As mentioned, since each of the vibration mode types $G_i(x_{pk})$ has a constant value, the equation (3)' can be referred to as the n-th dimension simultaneous equation of the n-th degree each having the vibration mode component $H_i(t)$ as a variable. Therefore, it is possible to obtain the reverse matrix components $G_{ik}'$ (i and k are column and row, respectively) of a matrix containing n x n components $G_i(x_{pk})$ (i and k are row and column, respectively).

Accordingly, the i-th vibration mode component can be represented as $$H_i(t) = \Sigma G_{ik}' \cdot Y(x_{pk},t) \tag{4}$$

and thus the torsional vibration at an arbitrary position j on the shaft system (coordinate being $x_j$) can be estimated as follow:

$$Y(x_j,t) = \overset{n}{\Sigma} G_i(x_j) \cdot H_i(t) \tag{5}$$
$$= \overset{n}{\Sigma} G_i(x_j)(\Sigma G_{ik}' \cdot Y(x_{pk},t))$$

However, this method of estimating the torsional vibration at the arbitrary position j has a disadvantage in that, when it is assumed that the torsional vibration of the rotating shaft system is an accumulation of the modal vibration up to the n-th degree, the vibration must be measured at the corresponding number, i.e., n, of points on the shaft.

Where the torsional vibration is picked-up by using a pick-up device having physical dimensions, it is generally desirable to reduce the number of the pick-up devices to be used. On the contrary, it is desired to increase the number of the pick-up devices in order to increase the precision of the estimation.

SUMMARY OF THE INVENTION

The present invention is intended to resolve the above discrepancy and an object thereof is to provide a torsional vibration monitoring method for a rotating shaft system by which up to 2n torsional vibrations at the arbitrary position of the rotating shaft system can be obtained from the torsional vibrations measured at the n positions of the shaft system.

In order to achieve the above object, according to the present invention, it is assumed that the torsional vibration $Y(x,t)$ produced in the rotating shaft system is a sum of modal vibrations $Y_i(x,t)$, that each of the modal vibrations is a product of vibration mode types $G_i(x)$ and vibration mode components $H_i$ are a product of vibration amplitudes $F_i(t)$ and periodic components $E_i(t)$, that the torsional vibration $Y(x,t)$ is a sum of up to 2n-th modal vibrations and that the vibration amplitude $F_i$ at a time t is the same as the vibration amplitude $F_i$ at a time after a minute time $\Delta t$ from t, as given below $$F_i(t) = F_i(t+\Delta t) = F_i'(t)$$

On the basis of the above assumptions, in the present invention, the following 2n-th dimention simultaneous equations of 2n-th degrees including $$\begin{cases} Y(x_{pk},t) = \sum_{}^{2n} G_i(x_{pk}) \cdot E_i(t) \cdot F_i(t) \\ Y(x_{pk}, t + \Delta t) = \sum_{}^{2n} G_i(k_{pk}) \cdot E_i(t + \Delta t) \cdot F_i(t) \end{cases}$$

the respective up to 2n-th vibration mode type $G_i(x_{pk})$ at the n certain selected positions by measuring the torsional vibrations $Y(x_{pk},t)$ at the n certain positions $x_{pk}$ (k=1, ..., n), the periodic components $E_i(t)$ and the periodic components $E_i(t+\Delta t)$ after the minute time $\Delta t$, all of which are known, and the vibration amplitude $F_i'(t)$ which are unknown are resolved. Then, by using the resultant vibration amplitude $F_i'(t)$, the torsional vibration $Y(x_j,t)$ at the arbitrary position $x_j$ on the rotating shaft system which can be represented by a sum of the vibration mode types $G_i(x_j)$, the vibration amplitude $F_i'(t)$ and the periodic components $E_i(t)$, up to the 2n-th degrees is obtained, as follows:

$$Y(x_j,t) = \sum^{2n} G_i(x_j) \cdot E_i(t) \cdot F_i'(t)$$

Other objects and features of the present invention will be more clearly understood by the following description with reference to the drawings.

BRIEF DESCRIPTION OF THE DRAWING

FIG. 2 shows various waveforms in the shaft system, in which FIG. 2A shows the torsional vibration at a certain (selected) position P, FIG. 2B shows waveforms obtained by modally decomposing the waveform in FIG. 2A, FIG. 2C shows modal torsional vibration waveforms at an arbitrary position j which are computed from the waveforms in FIG. 2B, FIG. 2D shows a torsional vibration waveform at the arbitrary position j which is obtained by composing the waveforms in FIG. 2C, and FIG. 2E is a stress waveform at the arbitrary position j;

DESCRIPTION OF THE PREFERRED EMBODIMENT

Figure 1:
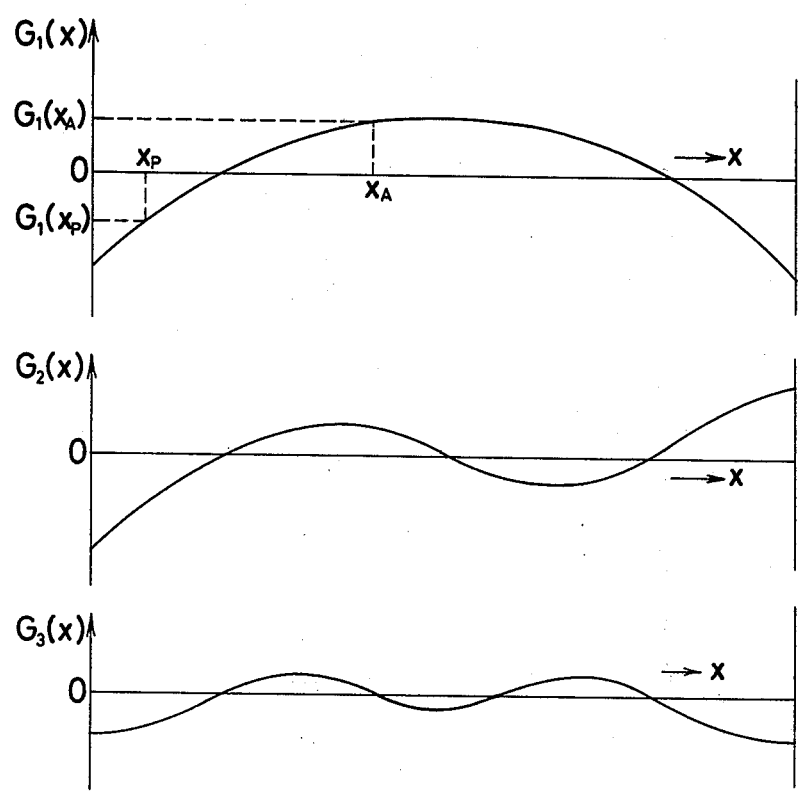
FIG. 1 is an explanatory illustration of torsional vibrations in a rotating shaft system.

The present invention will be described with reference to FIGS. 1 through 5.

In the equation (2), it is known that the vibration mode component $H_i(t)$ is a product of the vibration amplitude $F_i(t)$ and the periodic component $E_i(t)$. Therefore, the equation (2) can be rewritten as follow:

$$Y(x,t) = \Sigma G_i(x) \cdot H_i(t) \qquad (6)$$
$$= \Sigma G_i(x) \cdot E_i(t) \cdot F_i(t)$$

on the other hand, the periodic component $E_i(t)$ can be represented as $$E_i(t) = \cos(2\pi f_i t + \epsilon_i)$$

where $f_i$ is i-th specific vibration number of the rotating shaft system and $\epsilon_i$ is a phase.

Assuming that the above torsional vibration is represented by a sum of up to 2n-th modal vibrations, the torsional vibrations at the n certain positions pk (coordinate being $x_{pk}$, k=1, ..., n) measured at times t and (t+$\Delta$t) respectively, can be represented as follow:

$$\begin{cases} Y = (x_{pk},t) = \sum^{2n} G_i(x_{pk}) \cdot E_i(t) \cdot F_i(t) \\ Y = (x_{pk},t + \Delta t) = \sum^{2n} G_i(x_{pk}) \cdot E_i(t + \Delta t) \cdot F_i(t + \Delta t) \end{cases} \quad (7)$$

In this case, the variation of the vibration amplitude $F_i(t)$ during a minute time period $\Delta t$ is very small. Therefore, putting the vibration amplitude $F_i(t)$ as $$F_i(t) = F_i(t + \Delta t) = F_i'(t),$$

the equation (7) can be rewritten as follow:

$$\begin{cases} Y(x_{pk},t) = \Sigma G_i(x_{pk}) \cdot E_i(t) \cdot F_i'(t) \\ Y(x_{pk},t + \Delta t) = \Sigma G_i(x_{pk}) \cdot E_i(t + \Delta t) \cdot F_i'(t) \end{cases} \quad (8)$$

That is, the equation (7) becomes the 2n-th dimension simultaneous equation of the 2n-th degree containing $F_i'(t)$ (i=1, ..., 2n) as variable.

Considering a matrix defining components $m_{ki}$ as follow $$m_{ki} = \begin{cases} G_i(x_{pk}) E_i(t) \; [k = 1, \ldots, n] \\ G_i(x_{pk} - n) E_i(t + \Delta t) \; [k = n + 1, \ldots, 2n] \end{cases}$$

all of the components $m_{ki}$ are a function of t and can be preliminary obtained with a time and a certain position on the rotating shaft system. Therefore, defining the reverse matrix component of the matrix containing the components $m_{ki}$ as $m_{ik}'(t)$, the vibration amplitude $F_i'(t)$ can be obtained according to the following equation.

$$F_i'(t) = \sum_{k=1}^{n} m_{ik}'(t) \cdot Y(x_{pk},t) + \sum_{k=n+1}^{2n} m_{ik}'(t) \cdot Y(x_{pk} - n, t + \Delta t) \quad (9)$$

Accordingly, the torsional vibration at the arbitrary position j (coordinate being $x_j$) on the rotating shaft system can be estimated according to the equation (6), as follow:

$$Y(x_j,t) = \sum^{2n} G_i(x_j) \cdot E_i(t) \cdot F_i'(t) \quad (10)$$

According to this method, it is possible to estimate the torsional vibration at the arbitrary position with the modal vibration twice in number when the same number of the certain positions as that in the conventional method are set on the rotating shaft system, or it is possible to reduce the number of the certain positions to a half of that in the conventional method when the torsional vibrations at the arbitrary position should be estimated with the same number of the modal vibrations as that in the conventioal method.

The present invention will now be described in detail with reference to the embodiment shown in FIGS. 3 to 5.

In this embodiment, the value of n is set as the number 4. Further, this embodiment also includes a device for obtaining a fatigue expenditure life of the arbitrary position from the torsional vibration estimated thereat and a monitoring device for monitoring abnormal vibrations which may be unsuitable for estimation by the present method.

First of all, how to obtain the fatigue expenditure life will be described.

A stress due to a torsional vibration of the rotating shaft system is proportional to the amplitude of the torsional vibration. Therefore, assuming a proportional constant at an arbitrary position j (coordinate being $x_j$) as $\alpha_j$, the torsional vibration $Y(x_j,t)$ obtained by the present method at the arbitrary position j can be represented as follows. (See FIG. 2E)

$$\sigma_j = \alpha_j \cdot Y(x_j,t) \qquad (11)$$
$$= \sum_{i=1}^{2n} \alpha_j \cdot G_i(x_j) \cdot E_i(t) \cdot F_i'(t)$$

With the stress $\sigma_j$ at the arbitrary position j of the rotating shaft system Z, it is possible to calculate the fatigue expenditure life at the arbitrary position j by means of the known fatigue expenditure life estimation method using the S-N diagram (stress amplitude-fatigue repetition number) of material, and, in this embodiment, the calculation is performed according to the modified range-pair counting method.

In the range-pair counting method, it is assumed that the stress at the arbitrary position j is obtained according to the equation (11). Under this assumption, when denoting extreme values in the equation (11) by $\sigma_j^{(1)}$, $\sigma_j^{(2)}$ ..., respectively with time t, an amplitude variation $\Delta\sigma_j(k)$ of the stress waveform and a mean stress $\overline{\sigma}_j(k)$ when the extreme is shifted from k-th to (k+1)th value can be represented by the following equations, respectively.

$$\Delta \sigma_j^{(k)} = \tfrac{1}{2} | \sigma_j^{(k)} - \sigma_j^{(k+1)} | \qquad (12)$$
$$\overline{\sigma}_j^{(k)} = \tfrac{1}{2} | \sigma_j^{(k)} + \sigma_j^{(k+1)} | \qquad (13)$$

A stress variation $\Delta\sigma_{eqj}^{(k)}$ equivalent to the case of the mean stress being zero can be represented according to the modified Goodman chart as follow:

$$\Delta\sigma_{eqj}^{(k)} = \sigma_j^B \cdot \Delta \sigma_j^{(k)} /(\sigma_j^B - \overline{\sigma}_j^{(k)}) \qquad (14)$$

where $\sigma_j^B$ is a tension strength of the shaft at the point j thereof.

Figure 3:
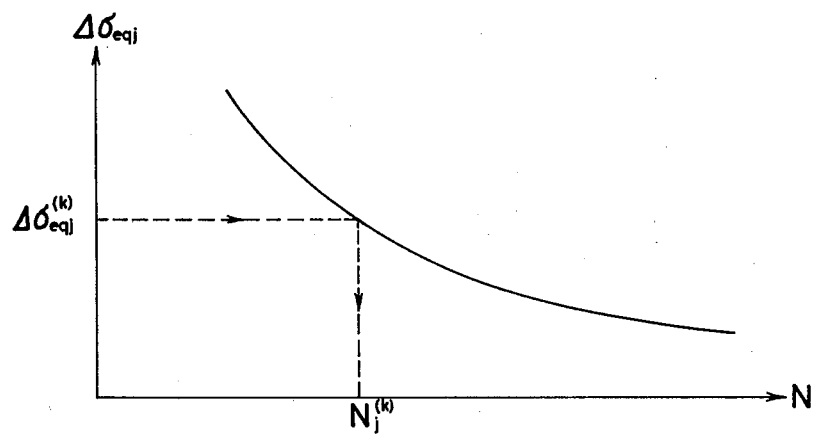
FIG. 3 is an S-N (stress amplitude—fatigue repetition number) diagram.

When the equivalent stress variation $\Delta\sigma_{eqj}^{(k)}$ between the k-th and (k+1)th extremes in the stress waveform at the arbitrary position j of the rotating shaft system is determined in this manner, the repetition number $N_j^{(k)}$ of the applications of the equivalent stress variation $\Delta\sigma_{eqj}^{(k)}$ to the arbitrary position j until the latter is broken down can be determined according to the S-N diagram in FIG. 3 which shows a relation between the stress variation and the number of repetitive applications of material.

On the other hand, the life expenditure $\Delta D_j^{(k)}$ due to the shift from the extreme value $\sigma_j^{(k)}$ to $\sigma_j^{(k+1)}$ can be represented, on the assumption that the stress variation is a half of a cycle of the stress wave, as follows:

$$\Delta D_j^{(k)} = 1/(2 \cdot N_j^{(k)}) \qquad (15)$$

Therefore, by calculating the stress variation at the arbitrary position j of the rotating shaft system, counting the number of the extreme values thereof and calculating and accumulating the life expenditure $\Delta D_j^{(k)}$ according to the equations (12) through (15), the life expenditure up to a time at which (n+1) extremes of the stress occur at the arbitrary position can be known. The following equation represents the life expenditure.

$$D_j = \sum_{k=1}^{n} \Delta D_j^{(k)} = \sum_{k=1}^{n} 1/(2 N_j^{(k)}) \qquad (16)$$

Figure 4:
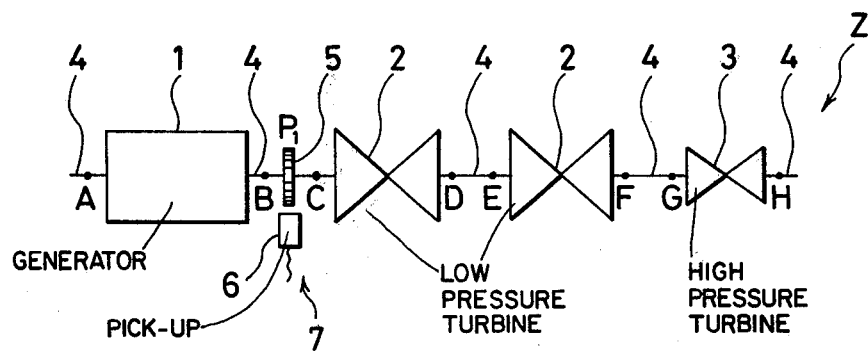
FIG. 4 is an embodiment of the present invention when applied to a turbine generator.
Figure 5:
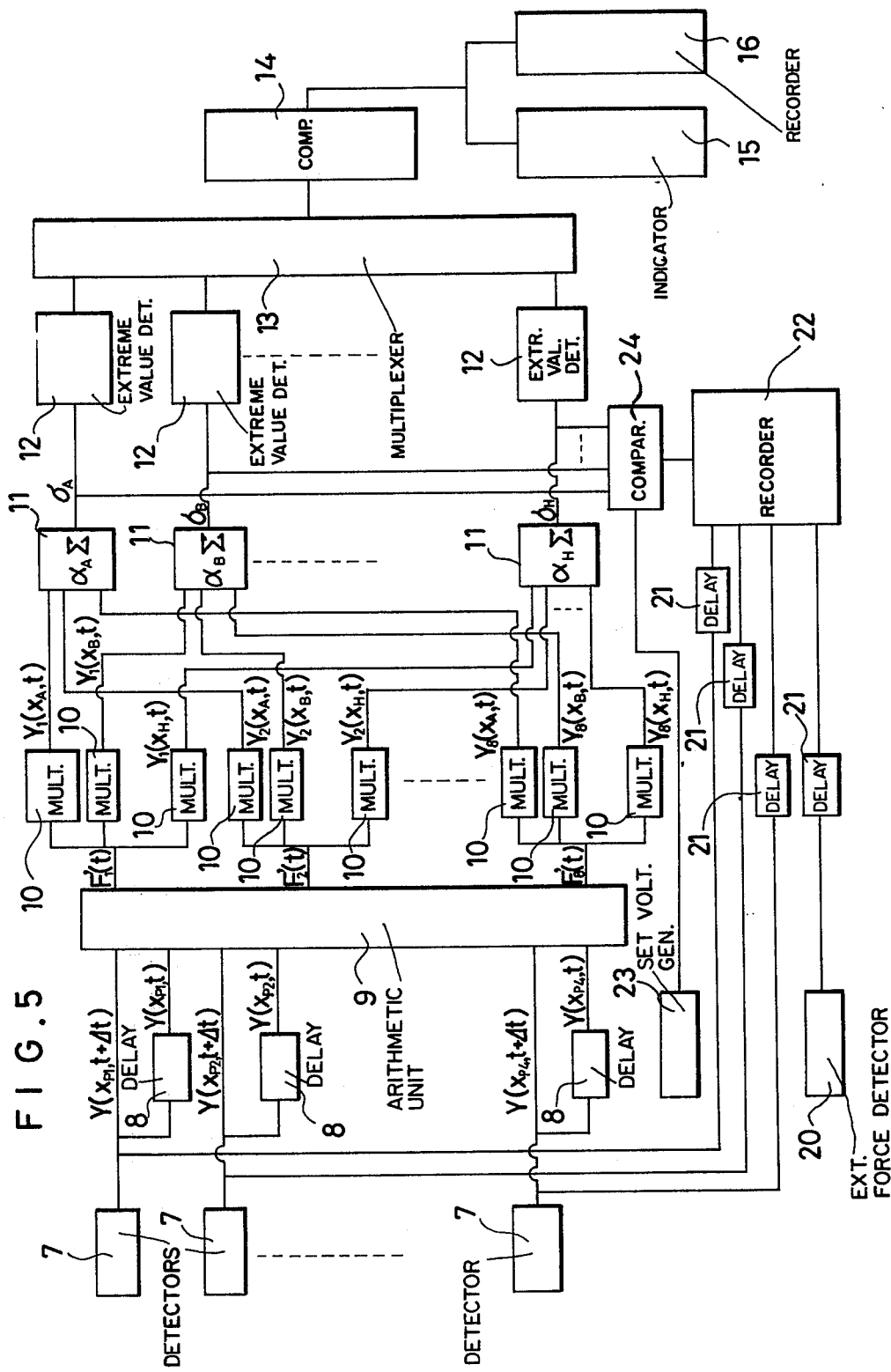
FIG. 5 is a block diagram of an apparatus for performing the present invention.

FIGS. 4 and 5 show an example of the apparatus for performing the present method. In FIG. 4, a generator 1 is driven by a low pressure turbines 2 and a high pressure turbine 3. A reference numeral 4 shows rotating shafts arranged in series for connecting the turbines to the generator 1 and constituting a rotating shaft system Z. A turning gear 5 is provided at one (p1, the coordinate being $x_{p1}$) of four certain or given positions pk set on the rotating shaft system and a pick-up device 6 serves for detecting the torsional vibration of the shafts 4 and, together with the turning gear 5, forms a detector (7) for detecting transient torsional vibration of shafts (4).

the certain position p1 can be set at any other position than that shown, on the rotating shafts 4, of course.

Points A to H show arbitrary positions on the rotating shafts 4 at which the torsional vibration is to be measured, and the coordinates thereof are $x_A$ to $x_H$, respectively. The settings of the points A to H are free and, therefore, the coordinate values thereof can be arbitrarily selected.

Referring to FIG. 5, delay circuits 8 apply the torsional vibrations obtained by the detector means 7 to a matrix arithmetic unit 9 with minute time delay $\Delta t$.

The matrix arithmetic unit 9 functions to obtain a reverse matrix of the matrix composed of 8×8 components $m_{ki}$ according to the simultaneous equations (8), to multiply the components $m_{ki}'(t)$ of the reverse matrix with the torsional vibrations obtained by the detector means 7 and the delay circuits 8 and to accumulate the results of the multiplications, i.e., to calculate up to the eighth vibration amplitudes $F_i'(t)$ shown by the equation (9).

Multipliers 10 multiply the vibration amplitude $F_i'(t)$ obtained by the matrix arithmetic unit 9 with the vibration mode types $G_i(x_j)$ and the periodic components $E_i(t)$ at the arbitrary position j (j=1, ..., k) to thereby obtain i-th modal vibration $Y_i(x_j,t)$ at the position j.

Adders 11 add the modal vibrations $Y_i(x_j,t)$ obtained by the multipliers for every arbitrary positions to thereby obtain the torsional vibrations at the respective arbitrary positions according to the equation (10). In this embodiment, the adders 11 are constituted such that it is possible to obtain the stress $\sigma_j$ shown by the equation (11) by multiplying the results of the additions with the proportional constants $\alpha_j$.

Extreme value detectors 12 detect the extreme values $\sigma_j^{(k)}$ (k=1, 2...) of the stress $\sigma_j$. The extreme values detected by the detectors 12 are fed to a computer 14 which computers the fatigue expenditure life according to the equations (12) to (16).

A multiplexer 13 combines the data from the extreme value detectors 12 and applies them to the computer 14. An indicator 15 and a recorder 16 serves for indicating the expenditure lifes at the respective arbitrary positions as computed by the computer and recording it, respectively. Therefore, it is possible, by the indicator 15 and the recorder 16, to know the expenditure life $D_j$ at the arbitrary position j being 1, i.e., the end of the life at the position j.

An external force detector 20 serves for detecting an external force due to an over load applied to the rotating shaft system Z which may be due to a thunder and a reference numeral 21 shows each of delay circuits for amending a time period from the starting of the recorder 22 to a time at which the rotation thereof are stabilized to assume a normal recording operation of the recorder 22. A reference numeral 23 is a set voltage generator 23 serves for generating a voltage corresponding to the set value $\sigma_s$ and a comparator 24 compares the stresses $\sigma_j$ at the arbitrary positions obtained by the adders 11 with the set value $\sigma_s$ and to start the recorder 22 when $\sigma_s, \sigma_j$.

The recorder 22 functions to record outputs of the external force detector 20 and the detectors 7. Therefore, when the stress at the arbitrary position becomes too large, it is possible to record the torsional vibration $Y(x_{pk},t)$ at the certain position pk and the external force applied to the rotating shaft system Z in the recorder 22. That is, when a stress larger than the set value, i.e., a vibration which may be undesirable to estimate by the linear decomposition thereof occurs in the rotating shaft system Z, the actual vibration at the position P as well as the external force applied at that time are recorded by the external force detector 20, the comparator 24 and the recorder 22. The data thus recorded may be used later in a larger computer to perform a sufficient analysis thereof and the recording of all of the data for an elongated period of time is unnecessary, resulting in economical monitoring.

As mentioned hereinbefore, according to the present invention, the torsional vibration produced in the rotating shafts 4 are detected by the detectors 7 disposed at, for example, four certain position pk and it is possible to calculate up to 2n-th torsional vibrations at the arbitrary position on the basis of the vibrations detected by the detectors 7. Further, according to the embodiment, it is possible to calculate the fatigue life expenditures at the arbitrary positions by obtaining the stresses.

In brief, in the present method, the rotating shaft system is monitored by not detecting the torsional vibrations by pick-up devices disposed at all points of the rotating shaft system Z at which monitoring is desired, but estimating the torsional vibrations at the desired points of the rotating shaft system by monitoring the limited number of points thereof. Therefore, there is no physical limitation in the monitoring position. Further, since the vibration at the point to be monitored, i.e., the arbitrary position can be estimated up to the 2n-th degree, a high precision monitoring becomes possible.

What is claimed is:

1. A torsional vibration monitoring method for a rotating shaft system wherein a torsional vibration $Y(x,t)$ produced in the rotating shaft system is a sum of modal vibrations $Y_i(x,t)$, each of the modal vibrations is a product of vibration mode types $G_i(x)$ and vibration mode components $H_i(t)$, the vibration mode components $H_i(t)$ is a product of vibration amplitudes $F_i(t)$ and periodic components $E_i(t)$, the torsional vibration $Y(x,t)$ is a sum of the up to 2n-th modal vibrations and the vibration amplitude $F_i(t)$ at a time t is the same as $F_i(t+\Delta t)$ at a time delayed by a minute at $\Delta t$ and represented by $F_i'(t)$, comprising the steps of measuring torsional vibrations $Y(x_{pk},t)$ with detectors at positions $x_{pk}$ (k=1 ...n) of the rotating shaft system obtaining vibration amplitudes $F_i'(t)$ from 2n simultaneous equations of 2n-th degrees including:

$$\begin{cases} Y(x_{pk},t) = \overset{2n}{\Sigma} G_i(x_{pk}) \cdot E_i(t) \cdot F_i(t) \\ Y(x_{pk}, t + \Delta t) = \overset{2n}{\Sigma} G_i(k_{pk}) \cdot E_i(t + \Delta t) \cdot F_i(t) \end{cases}$$

in arithmetic means by using the known mode types $G_i(x_{pk})$ up to the 2n-th, the known periodic components $E_i(t)$ up to the 2n-th, and the known periodic components $E_i(t+\Delta t)$ up to the 2n-th after the minute time $\Delta t$; and obtaining torsional vibrations $Y(x_j,t)$ at the arbitrary positions $x_j$ of the rotating shaft system with multiplying means by using the known vibration amplitude $F_i'(t)$, the known vibration mode types $G_i(x_j)$ and the periodic components $E_i(t)$ according to the equation:

$$Y(x_j,t) = \overset{2n}{\Sigma} G_i(x_j) \cdot E_i(t) \cdot F_i'(t).$$

2. A torsional vibration monitoring method as claimed in claim 1, further comprising the steps of obtaining a stress $\sigma_j$ by multiplying the torsional vibration at the arbitrary position $x_j$ with a proportional constant $a_j$ and calculating an expenditure of life at the arbitrary position $x_j$ with using the stress $\sigma_j$ according to the modified range counting method.

3. A torsional vibration monitoring apparatus for a rotating shaft system, comprising: a plurality of detectors at a plurality of positions $x_{pk}$ of the rotating shaft system for measuring torsional vibrations $Y(x_{pk},t)$ where (k=1 . . . n); a plurality of delay means each connected to one of said detectors for delaying the output of said detectors by a time $\Delta t$; arithmetic means responsive to said detectors in said delay means for producing values corresponding to the vibration amplitudes $F_i'(t)$ at a plurality of mode types; a plurality of multipliers for multiplying the values corresponding to the amplitudes $F_i'(t)$ with vibration mode types $G_i(x_j)$ and periodic components $E_i(t)$ at a plurality of arbitrarily chosen positions j, where j=1, ..., k to obtain modal vibrations $Y_i(x_j,t)$ at each of the positions j; a plurality of adders connected to said multipliers for adding the modal vibrations $Y_i(x_j,t)$ at the multipliers for each selected position j so as to obtain the torsional vibration at the respective positions; and means for indicating and recording the outputs of said adders.

4. An apparatus as in claim 3, wherein said means for indicating and recording the output includes an indicator and a recorder.

5. An apparatus as in claim 3, wherein said means for indicating and recording includes a plurality of extreme value detectors each connected to one of said adders, a multiplexer connected to each of said extreme value detectors, computing means connected to said multiplexer, an indicator connected to said computing means, and a recorder connected to said computing means.

* * * * *